United States Patent [19]

Steinbach et al.

[11] 4,077,651
[45] Mar. 7, 1978

[54] HYDRAULIC STEERING FOR PLOW

[75] Inventors: James Gerald Steinbach, Davenport, Iowa; Gary Allen Rehn, Andover, Ill.; William Wayne Jackson, Bettendorf, Iowa

[73] Assignee: Deere & Company, Moline, Ill.

[21] Appl. No.: 729,611

[22] Filed: Oct. 1, 1976

[51] Int. Cl.² .................. A01B 69/00; B62D 53/00
[52] U.S. Cl. .................................. 280/426; 60/546; 172/283; 172/285; 172/646
[58] Field of Search ............... 280/419, 426, 442, 443, 280/444, 445; 172/285, 284, 282, 286, 288, 283, 646; 60/546, 698, 592

[56] References Cited

U.S. PATENT DOCUMENTS

| 3,910,353 | 10/1975 | Ralston | 280/426 X |
| 4,006,664 | 2/1977 | Brown | 60/546 X |

Primary Examiner—Joseph F. Peters, Jr.
Assistant Examiner—John A. Pekar

[57] ABSTRACT

A tractor-trailed plow having a steerable rear wheel is provided with a hydraulically powered steering system including master and slave cylinders arranged to steer the rear wheel in response to changes in the angular position of the plow with respect to the tractor. A rephasing valve system is provided that is responsive to turning of the tractor for proper phasing of the master and slave cylinders.

15 Claims, 3 Drawing Figures

HYDRAULIC STEERING FOR PLOW

BACKGROUND OF THE INVENTION

It has heretofore been known to provide a master cylinder between the plow and the hitch which operates a slave cylinder mounted on the plow and extending between the plow and the rear steerable wheel. Such an arrangement is for purposes of adjusting the rear steerable wheel in response to the tractor turning with respect to the plow. It is critical that the rear steerable wheel is steered in a relatively accurate manner so that the plow, when the tractor is turning with respect to it, tracks the tractor and makes the very minimum turn radius. In the master slave cylinders, it is, therefore, necessary that the two cylinders remain in phase with one another so that the accuracy that is built into the system may be maintained throughout all operations. Also, it is necessary that a fluid source be provided for the master and slave cylinder to make up fluid that may be lost from leakage. Since present day plows require several adjustments which may normally use hydraulic cylinders, it is often a problem of having enough hydraulic fluid outlets on the tractor and valve controls at the tractor seat to operate all of the various controls on the plow. In some instances, turn buckle arrangements are used rather than cylinders since there are not sufficient outlets on the tractor. Such turn buckle or manual arrangements of course create problems since the adjustments are no longer available in an "on the go" arrangement from the tractor.

SUMMARY OF THE INVENTION

With the above in mind, it is the primary object of the present invention to provide a master and slave cylinder arrangement for controlling the rear steerable wheel on a tractor. It is further proposed to use a valve having a valve chamber with outlets in communication with the rod ends and the base ends of the master-slave cylinders and which has an inlet in communication with a fluid line leading to any of the other hydraulic power units on the plow. The inlet is normally open to the outlet leading to the rod end of the master-slave cylinder. A valve is provided within the chamber and normally blocks movement of fluid through the outlet to the base ends of the master-slave cylinders. The valve also has an external part which is operative upon the tractor making a full right turn to shift the valve to open the rod end oulet to the base end outlet thereby putting both outlets in communication with the pressure line. With such an arrangement the master and slave cylinders may be filled with fluid and each time the tractor makes a full right turn the master and slave cylinders are moved into phase with one another.

DESCRIPTION OF A PREFERRED EMBODIMENT

Figure 1:
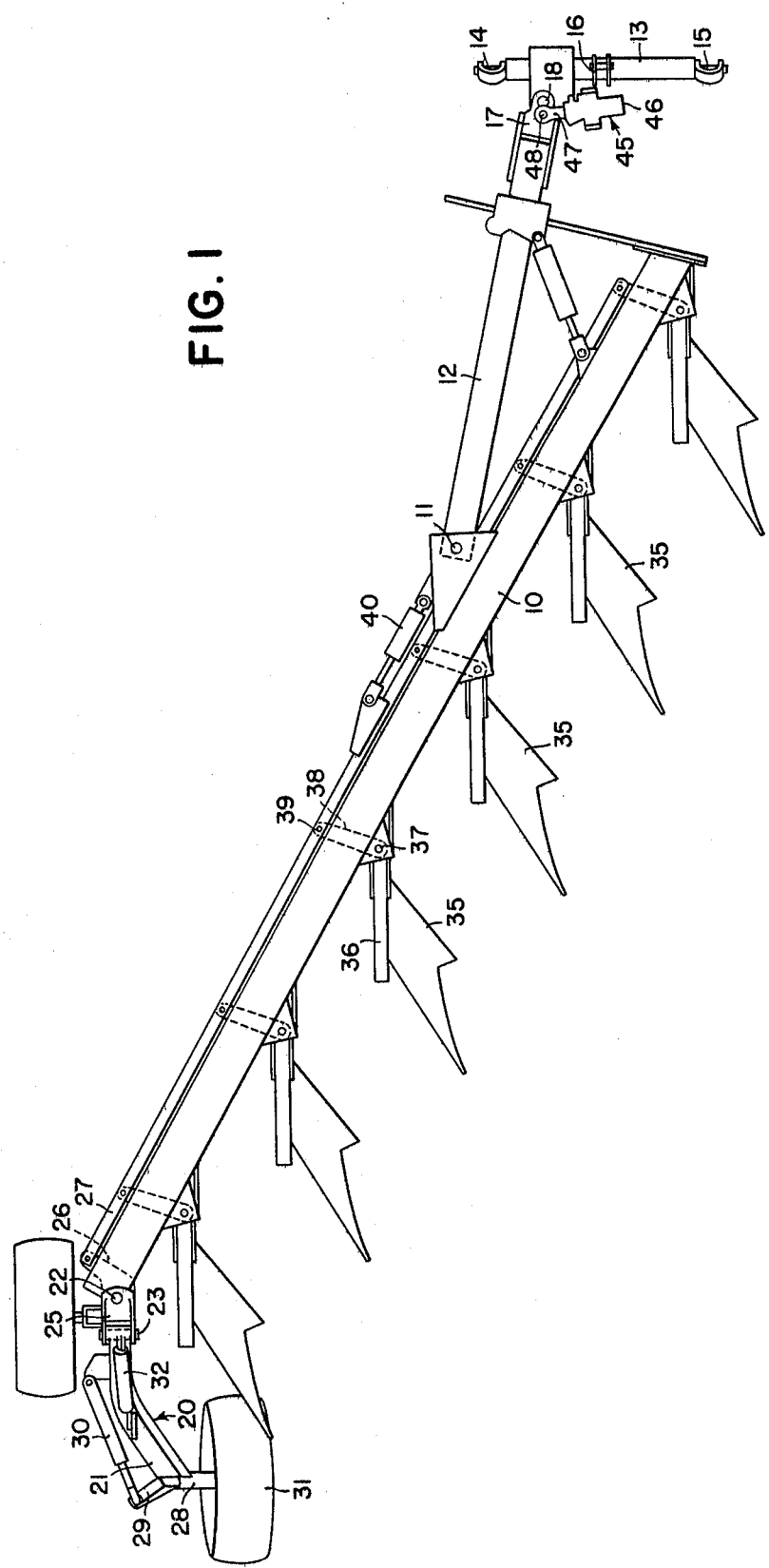
FIG. 1 is a plan view of the plow incorporating the features of the present invention.

Referring now to FIG. 1, the plow is normally composed of an elongated main frame or beam 10 disposed diagonally with respect to the direction of travel. Pivotally mounted to swing about a pivot pin 11 is an elongated drawbar 12 that forms part of a hitch connected to a tractor. A forward part 13 of the hitch has transversely spaced connecting members 14, 15 that connect directly to the lower links of a tractor three-point hitch connection. A mast 16 is provided on the hitch member 13 for connection to the upper link of the three-point hitch connection. It is quite apparent, therefore, that the forward hitch member or part 13 is relatively rigid with and moves with the tractor. A knuckle 17 provides a vertical connection at 18 between the forward hitch member 13 and the rear hitch member 12. Thus, the entire plow, which includes the frame 10 and the hitch member 12, swings laterally about the vertical pivot 18.

Supporting the rear of the plow frame 10 is a steering wheel assembly 20 directly connected to the rear end of the main beam 10 by a knuckle so that wheel support beam 21 swing about a vertical axis, indicated at 22, and a horizontal axis, indicated at 23. A knuckle 25 connects the main beam 10 to the tail wheel beam 21 and has an arm 26 that extends under the main beam 10 and is connected to an elongated metal strap 27, the purpose of which will later become apparent. A spindle structure 28 on the rear end of the tail wheel beam 21 has an arm 29 at its upper end. A slave cylinder 30 is mounted on the tail wheel beam and connects to the outer end of the arm 29. As the cylinder 30 extends and retracts it of course turns the wheel 31. For purposes of raising the rear end of the main frame 10 on the tail wheel assembly 20, a power cylinder 32 extends between the beam 21 and the knuckle 25. Extension or retraction of the cylinder raises and lowers the main frame 10 about the axis 23 that connects the main frame 10 to the tail wheel beam 21. Spaced equally along the diagonal frame are plow bottoms 35, each having a supporting structure 36 that is pivotally mounted to swing about a vertical pivot pin 37. Each mounting structure has an arm 38 rigid therewith and extending under the diagonal beam to an end adjacent the elongated strap 27. Vertical pivot pins 39 connect the arms 38 to the strap 27. A power operated hydraulic cylinder 40 has one end anchored to the diagonal beam 10 and the opposite end connected to the strap 27. It is clear, therefore, that extension and retraction of the cylinder 40 causes the plow bottoms 35 to swing about their respective pivot pins 37 and also causes the rear wheel assembly 20 to swing about its pivot 22.

Figure 3:
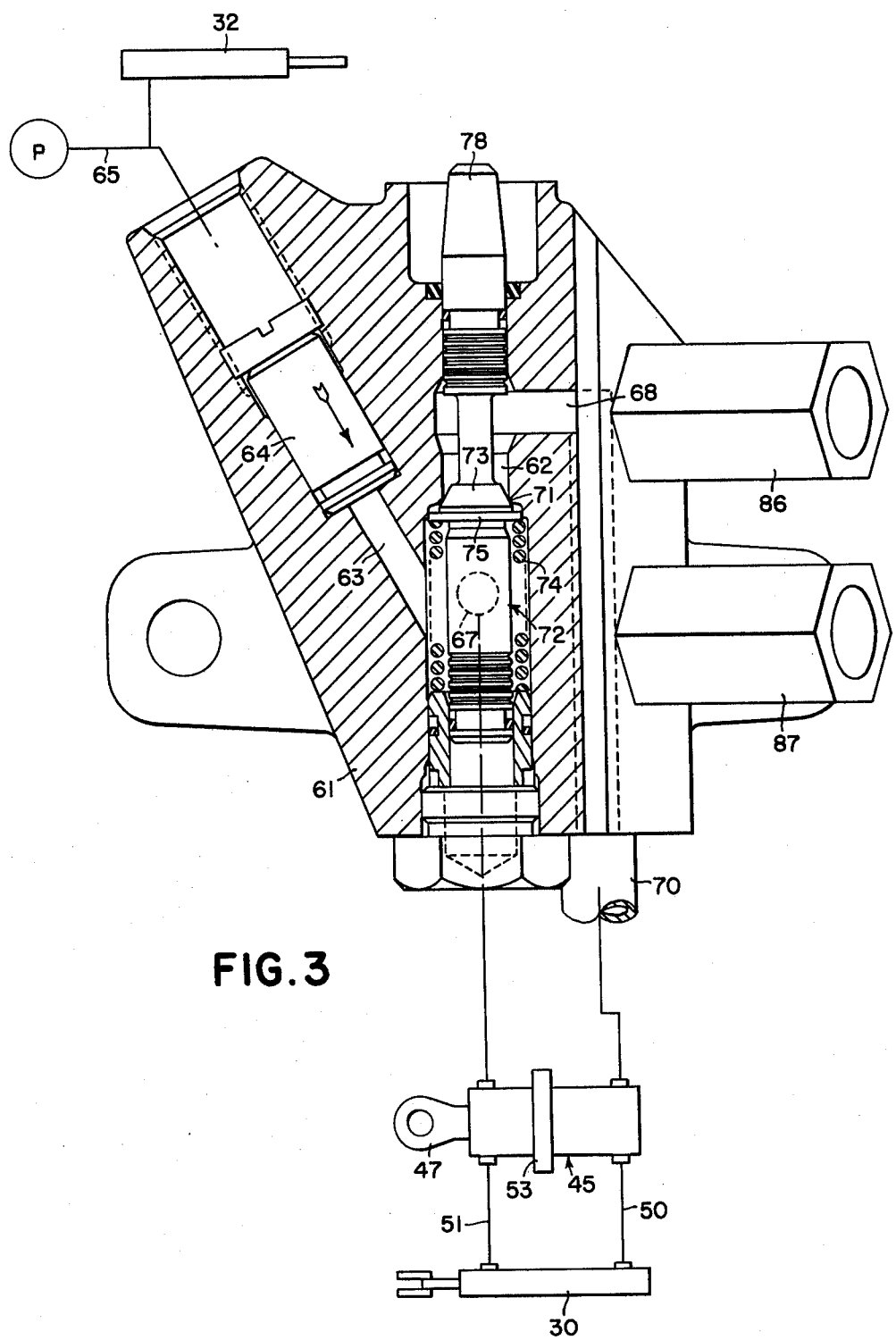
FIG. 3 is a sectional view of the valve and showing the cylinder structure of the plow in schematic.

Mounted on the forward end of the plow and specifically on the front crossbeam structure 13 is a master cylinder 45. The cylinder end 46 is anchored to the transverse beam 13 and will shift with with the tractor. The rod end 47 is pivotally connected at 48 to the knuckle 17. The vertical axis of the pin 48 is generally behind the vertical pivotal axis of the pin 18. Also, it is obvious that the knuckle 17 will shift with the tongue or drawbar member 12. As is conventional, the cylinder or base ends of the master and slave cylinders 45, 30 are interconnected by conduit means, indicated symbolically at 50 in FIG. 3. Also, the rod ends of the master and slave cylinders 45, 30 are interjoined by a conduit 51. The cylinder 45 is embraced by a collar 53, and a yoke member 54 is pivotally mounted on the crossbeam 13 and has upwardly extending legs 55, 56 that are bolted as at 57 to the collar. Thus the entire cylinder 45 may swing on the axis of the yoke 54.

Mounted directly on the cylinder 45 is a valve indicated in its entirety by the numeral 60. The valve 60 includes a valve housing 61 with a central bore 62. A fluid inlet 63 has a check valve 64 therein that permits fluid to enter the bore 62 but blocks passage out of the inlet 63 to a pressure line 65 that leads to the cylinder end of the lift cylinder 32. Consequently, under normal operation the inlet 63 is always under pressure. The bore 62 has an outlet 67 that leads to the rod ends of the master and slave cylinders 45, 30. The bore 62 also has an outlet 68 that is in communication first through a pipe 70 to the base end of the master cylinder and then through the conduit 50 to the base or cylinder end of the slave cylinder 30. The bore 62 also has a shoulder 71. Provided in the bore 62 is a spool valve 72 that has a cone shaped portion 73 normally resting against the shoulder 71 and blocking passage of fluid from the inlet 63 and outlet 67 to the outlet 68 leading to the cylinder ends of the master-slave cylinders 45, 30. A spring 74 bears against a collar 75 on the spool so as to insure seating of the cone shaped portion 73 against the shoulder 71. The spool 72 also has a portion 78 that projects externally out of the housing or chamber 61.

Figure 2:
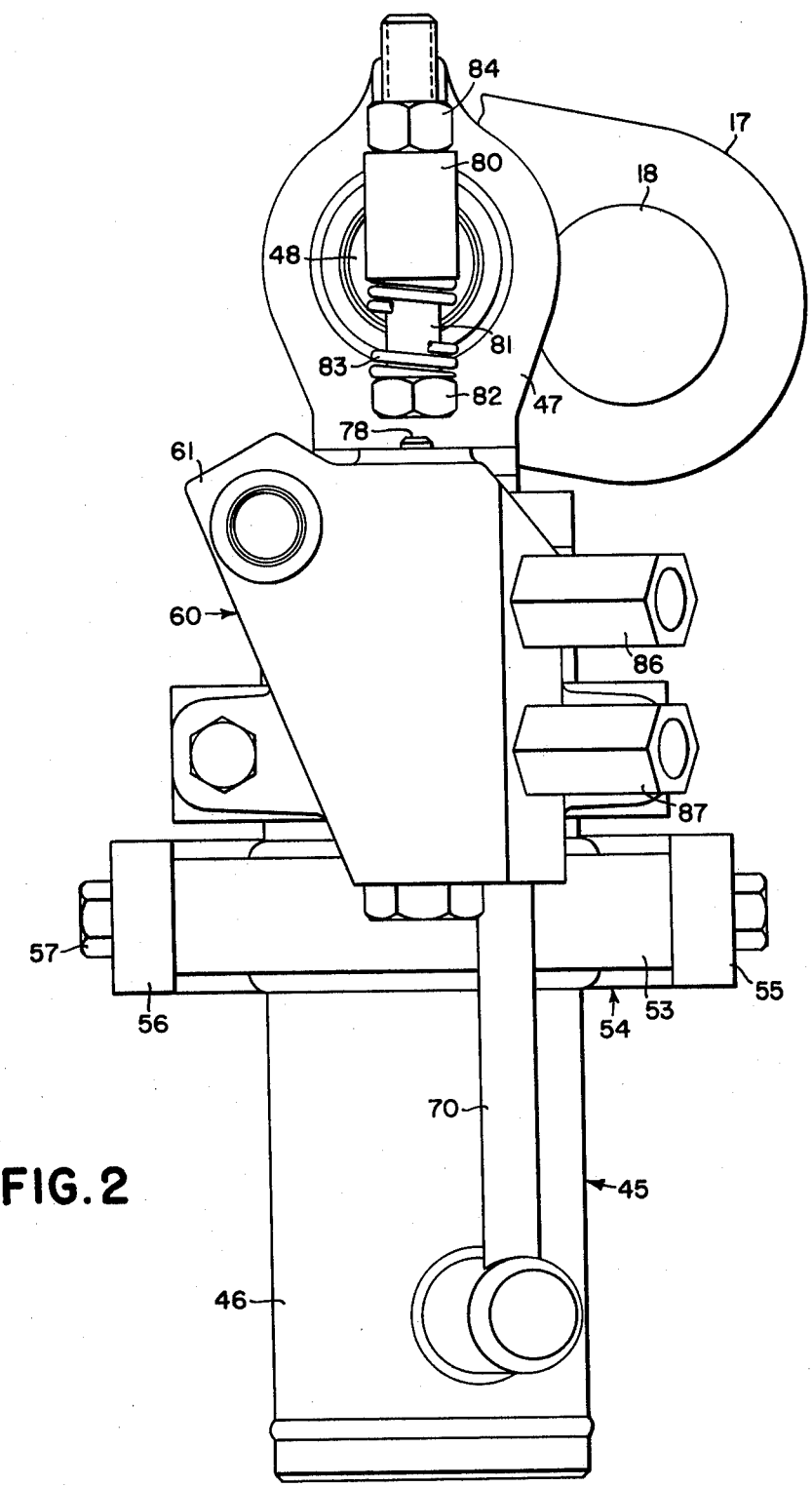
FIG. 2 is an enlarged plan view of the master cylinder and its associated valve structure.

Referring now to FIG. 2: Fixed to the extreme end of the rod portion 47 is a casting 80 with an opening therein that receives the shank of a bolt 81. The bolt head 82 is generally in axial alignment with the spindle 72 and is positioned to contact the external parts 78 of that spindle. The bolt 81 is free to move in the casting 80 but is restricted in movement by a spring 83 that is positioned between the head 82 and the casting 80. A nut 84 limits movement of the bolt toward part 78. The spring, of course, holds the nut 84 against the casting 80.

Referring again to the valve structure 60: There is provided a pair of relief valves 86, 87 in communication with the fluid passage to the piston sides of the master and slave cylinders 45, 30 and to the rod ends of the master and slave cylinders 45, 30. These are of a conventional nature and serve the purpose of preventing an excess pressure to be built up in either of the respective passageways.

The valve system operates in the following manner. When the plow is shifted into a transport position, fluid exists in the passage 65 for operating the transport cylinder 32. Consequently fluid is introduced through the inlet 63 and since there is no obstruction, fluid will pass through the outlet 67 to both rod ends of the master and slave cylinders 45, 30. Since the relationship of the tractor to the plow will determine the position of the master cylinder, nothing will occur with respect to movement of the piston in that cylinder. However, the fluid will move into the rod end of the slave cylinder 30 and may cause the rod of the slave cylinder 30 to retract. The operator on the tractor may purposely or in normal operation make a right turn which causes the part 78 of the valve to contact the bolt head 82 thereby unseating the portion of the valve 73 from the shoulder 71. At this time, both outlets 67, 68 will be opened and under pressure and fluid will then move under pressure to both the cylinder ends and the rod ends of the master and slave cylinders 45, 30. Since the tractor is generally at its maximum right turn when the valve 78 is unseated, the piston in the master cylinder will generally be in its almost fully retracted position. Upon both outlets 67, 68 being opened the fluid will pass through the conduit 50 to the head end of the slave cylinder 30 and, due to the differential of area between the base end and rod end sides of the piston in the slave cylinder 30, the cylinder will fully extend. This will cause fluid to move back into the conduit 51 and into the rod end of the master cylinder 45 and back through the outlet 67. At this point, both ends of the master and slave cylinder are completely full of fluid and properly in phase with one another. The tractor may then be turned left away from the full right turn, at which time the valve 73 again seats against the shoulder 71. Since the check valve 64 blocks off fluid from leaving through the inlet 63 and the valve portion 73 is seated to block movement of fluid between outlet 68 and outlet 67, fluid is movable only between the master and slave cylinders through conduits 50, 51.

From time to time and for various reasons, the master-slave combination will become out of phase due to internal and/or external leakage. When this occurs it is only necessary to turn the tractor a full right turn in transport to again open the valve 72 and to permit make-up fluid to pass through the outlet 68 into the respective head ends of the master-slave cylinders 45, 30. Since a plow-tractor combination normally will make several full right turns in transport during the course of a working day, the master and slave cylinders will automatically rephase minimizing the affect of leakage in the system. Since there is always pressure on the lift cylinder 32, when the plow is in transport position there will generally be sufficient pressure and/or fluid available to accomplish rephasing in the master and slave arrangement. It should also be noted that when the plow is in transport position the weight of the plows is carried by the lift cylinder 32. Consequently, when going to a field after a shut-down of the plow over a period of time if there is any question in the operator's mind as to whether the slave and master cylinder are in phase with one another, a simple right turn of the tractor will ensure the operator of the correct phasing.

We claim:

1. In a plow having an elongated main frame adapted for support at its forward end on a tractor so as to permit lateral swinging of the plow relative to a tractor for purposes of turning, said frame having at its rear end a vertically shiftable structure, a steerable wheel carried on the structure, a hydraulic lift cylinder having a fluid pressure source and extending between the frame and vertically shiftable structure for raising and lowering the frame relative to the ground, the improvement residing in: a master cylinder anchored at opposite ends to shift with the tractor and plow respectively to thereby sense turning of the tractor; a slave cylinder anchored at opposite ends to the vertical shiftable structure and wheel for effecting steering of the latter; first and second conduit means extending respectively between the rod ends of the slave and master cylinders and the closed ends of the slave and master cylinders; and a valve means having a valve inlet in communication with the fluid pressure source to the lift cylinder and a pair of valve outlets in communication with the rod ends and closed ends respectively of the master and slave cylinders and including a valve member biased to block passage of fluid from the inlet to the outlet in communication with the closed ends while retaining communication between the inlet and the outlet to the rod ends, said valve member having a valve control part engageable to shift the valve member upon the tractor turning with respect to the plow a predetermined amount to thereby afford communication between the outlets to the rod and closed ends.

2. The invention defined in claim 1 in which the valve member is a spindle valve normally seated to close off passage between the inlet and outlet to the closed ends and has an external portion that is disposed to engage and shift upon the turning angle between the tractor and plow approaching its maximum.

3. The invention defined in claim 1 in which the valve means is supported on the master cylinder, the valve is a spindle valve having its axis extending lengthwise of the master cylinder, and the aforesaid control part is a portion of the spindle that extends externally, and there is an abutment on the rod end of the master cylinder that is engageable with the spindle part as the rod approaches its fully retracted position.

4. The invention defined in claim 1 further characterized by the valve means having a check valve member permitting movement of fluid in a direction only from the fluid power source to the valve means.

5. In a plow having a main frame supporting a plurality of plow bottoms, a hitch connection for a tractor including a vertical pivot permitting the plow frame to swing laterally with respect to the tractor as the tractor turns, and a steerable tail wheel supported on the rear portion of the frame, the improvement residing in a hydraulic steering mechanism for the wheel comprising: a master cylinder sensing the angular relation between the tractor and plow frame; a slave cylinder connected with opposite ends to the wheel and frame respectively; fluid conduit means connecting the rod ends of the master and slave cylinders and the base ends of the master and slave cylinders and for affording turning of the tail wheel in response to turning of the tractor relative to the plow frame; a valve structure including a chamber having a fluid inlet opening to a fluid pressure line of the tractor and a rod end outlet and a closed end outlet in communication with one another and respectively with the rod ends and the closed ends of said master and slave cylinders; and a valve means in said chamber normally blocking the closed end outlet from communication with the rod end outlet and the inlet, said valve means affording communication between the inlet and said rod end outlet, said valve means further having a part associated therewith and external of the chamber and effective upon said tractor being in a full right turn relation with respect to the plow frame to adjust the valve means to permit communication between the inlet and the closed end outlet and between the rod end outlet and the closed end outlet.

6. In a plow having an elongated main frame adapted for its support at its forward end on a tractor so as to permit lateral swinging of the plow relative to a tractor for purposes of turning, said frame having at its rear end a vertically shiftable structure, a steerable wheel carried on the structure, a hydraulic lift cylinder having a fluid pressure source and extending between the frame and vertically shiftable structure for raising and lowering the frame relative to the ground, the improvement residing in: a master cylinder anchored at opposite ends to shift with the tractor and plow respectively to thereby sense the turning of the tractor; a slave cylinder anchored at opposite ends to the vertical shiftable structure and wheel for effecting steering of the latter; first and second conduit means extending respectively between the rod ends of the slave and master cylinders and the closed ends of the slave and master cylinders, said first conduit means being in communication with the fluid pressure source to the lift cylinder; and a valve means in communication with the closed ends and the rod ends of the master and slave cylinders and including a valve member biased to block communication from the fluid source to the closed ends and between the rod ends and the closed ends, said valve member having a valve control part engageable to shift the valve member upon the tractor turning a predetermined amount with respect to the plow to thereby afford communication between the pressure source and the closed ends.

7. The invention defined in claim 6 further characterized by a check valve between the fluid pressure source and said rod ends constantly open to permit fluid under pressure to enter the rod ends but preventing fluid from moving from the rod ends to the fluid source.

8. In a plow having an elongated main frame adapted for its support at its forward end on a tractor so as to permit lateral swinging of the plow relative to a tractor for purposes of turning, said frame having at its rear end a vertically shiftable structure, a steerable wheel carried on the structure, and a hydraulic lift cylinder having a fluid pressure source and extending between the frame and vertically shiftable structure for raising and lowering the frame relative to the ground, the improvement residing in: a master cylinder anchored at opposite ends to shift with the tractor and plow respectively to thereby sense the turning of the tractor; a slave cylinder anchored at opposite ends to the vertical shiftable structure and wheel for effecting steering of the latter; first and second passage means extending respectively between the rod ends of the slave and master cylinders and the closed ends of the slave and master cylinders, said passage means to the rod ends being in constant communication with the pressure source; and a valve means in communication with the fluid pressure source to the lift cylinder and in communication with the closed ends and the rod ends of the master and slave cylinders and including a spindle valve extending lengthwise of the master cylinder and biased to block passage of fluid from the pressure source to the closed ends and between the rod ends and the closed ends while permitting communication between the pressure source and the rod ends, said spindle valve having an external part, an abutment on the rod of said master cylinder engageable with the external part upon the tractor turning a predetermined amount with respect to the plow to thereby shift said spindle valve and afford communication between the pressure source and closed ends.

9. The invention defined in claim 8 in which the abutment on said rod end is adjustable axially with respect to the spindle valve so that the opening to said outlet may occur at a selected turning angle between the tractor and plow.

10. The invention defined in claim 8 further characterized by a one way valve between the pressure source and first passage means permitting the flow of fluid from the source to the passage means.

11. In a plow having a main frame supporting a plurality of plow bottoms, a hitch connection for a tractor including a vertical pivot permitting the plow frame to swing laterally with respect to the tractor as the tractor turns, and a steerable tail wheel supported on the rear portion of the frame, the improvement residing in a hydraulic steering mechanism for the wheel comprising: a master cylinder sensing the angular relation between the tractor and plow frame; a slave cylinder connected with opposite ends to the wheel and frame respectively; fluid conduit means connecting the rod ends of the master and slave cylinders and the closed ends of the master and slave cylinders and for affording turning of the tail wheel in response to turning of the tractor relative to the plow frame; a valve structure including a chamber having a fluid inlet opening to a fluid pressure line of the tractor and rod end and closed end outlets in communication with one another and with the rod ends and the closed ends of said master and slave cylinders; and a valve means in said chamber normally blocking communication between the outlets and between the inlet and one of the outlets, said valve means having a part associated therewith and external of the chamber and effective upon said tractor being turned a predetermined amount with respect to the plow frame to adjust the valve means to permit communication between the inlet and the outlet that is normally blocked from said inlet and between the outlets.

12. In a plow having a main frame supporting a plurality of plow bottoms, a hitch connection for a tractor having a fluid pressure source and including a vertical pivot permitting the plow frame to swing laterally with respect to the tractor as the tractor turns, and a steerable tail wheel supported on the rear portion of the frame, the improvement residing in a hydraulic steering mechanism for the wheel comprising: a master cylinder sensing the angular relation between the tractor and plow frame; a slave cylinder connected with opposite ends to the wheel and frame respectively; fluid conduit means connecting the rod ends of the master and slave cylinders to the pressure source and to one another, said fluid conduit means also connecting the closed ends of the master and slave cylinders and for affording turning of the tail wheel in response to turning of the tractor relative to the plow frame; a valve structure including a chamber having a rod end outlet and a closed end outlet in communication respectively with the rod ends and the closed ends of said master and slave cylinders; and a valve means in said chamber normally blocking communication between the closed end outlet and the rod end outlet, said valve means having a part associated therewith and external of the chamber and effective upon said tractor being turned a predetermined amount with respect to the plow frame to adjust the valve means to permit communication between the rod and closed end outlets.

13. The invention described in claim 12 characterized by the valve means having a fluid inlet opening to the pressure source and in constant communication with the outlet to the rod ends to thereby become the portion of the aforesaid conduit means that connects the rod ends of the master and slave cylinders to the pressure source.

14. In a plow having a main frame supporting a plurality of plow bottoms, a hitch connection for a tractor having a fluid pressure source and including a vertical pivot permitting the plow frame to swing laterally with respect to the tractor as the tractor turns, and a steerable tail wheel supported on the rear portion of the frame, the improvement residing in a hydraulic steering mechanism for the wheel comprising: a master cylinder sensing the angular relation between the tractor and plow frame; a slave cylinder connected with opposite ends to the wheel and frame respectively; first and second fluid conduit means connecting the rod ends of the master and slave cylinders and the closed ends of the master and slave cylinders and for affording turning of the tail wheel in response to turning of the tractor relative to the plow frame, one of said first and second conduit means being in communication with said fluid pressure source; a valve structure including a chamber having a rod end outlet and a closed end outlet in communication respectively with the rod ends and the closed ends of said master and slave cylinders; and a valve means in said chamber normally blocking communication between the closed end outlet and the rod end outlet, said valve means having a part associated therewith and external of the chamber and effective upon said tractor being turned a predetermined amount with respect to the plow frame to adjust the valve means to permit communication between the rod and closed end outlets.

15. In an implement having a main frame, a hitch connection for a tractor having a fluid pressure source and including a vertical pivot permitting the plow frame to swing laterally with respect to the tractor as the tractor turns, and a steerable tail wheel supported on the rear portion of the frame, the improvement residing in a hydraulic steering mechanism for the wheel comprising: a master cylinder sensing the angular relation between the tractor and frame; a slave cylinder connected with opposite ends to the wheel and frame respectively; first and second fluid conduit means connecting the rod ends of the master and slave cylinders and the closed ends of the master and slave cylinders and for affording turning of the tail wheel in response to turning of the tractor relative to the frame, one of said first and second conduit means being in communication with said fluid pressure source; a valve structure including a chamber having a rod end outlet and a closed end outlet in communication respectively with the rod ends and the closed ends of said master and slave cylinders; and a valve means in said chamber normally blocking communication between the closed end outlet and the rod end outlet, said valve means having a part associated therewith and external of the chamber and effective upon said tractor being turned a predetermined amount with respect to the frame to adjust the valve means to permit communication between the rod and closed end outlets.

* * * * *